US011176514B1

(12) United States Patent
Freeman

(10) Patent No.: US 11,176,514 B1
(45) Date of Patent: Nov. 16, 2021

(54) COMPUTER-IMPLEMENTED METHOD AND A NON-TRANSITORY COMPUTER-READABLE MEDIUM FOR FACILITATING INITIATION OF CUSTOMER RETURNS

(71) Applicant: Amazon Technologies, Inc., Reno, NV (US)

(72) Inventor: Kyle A. Freeman, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 904 days.

(21) Appl. No.: 15/014,903

(22) Filed: Feb. 3, 2016

Related U.S. Application Data

(62) Division of application No. 13/280,743, filed on Oct. 25, 2011, now Pat. No. 9,292,824.

(51) Int. Cl.
*G06Q 30/00* (2012.01)
*G06Q 10/08* (2012.01)
*G06K 19/06* (2006.01)

(52) U.S. Cl.
CPC ... *G06Q 10/0837* (2013.01); *G06K 19/06037* (2013.01)

(58) Field of Classification Search
CPC ............... G06Q 10/0837; G06K 19/06037
USPC ........................................................ 705/26.1
See application file for complete search history.

(56) References Cited

U.S. PATENT DOCUMENTS

| | | | |
|---|---|---|---|
| 6,868,433 B1 | 3/2005 | Philyaw | |
| 7,318,047 B1 * | 1/2008 | Foth | G06Q 20/02 705/26.4 |
| 7,428,499 B1 | 9/2008 | Philyaw | |
| 8,386,337 B2 | 2/2013 | Siegel | |
| 2002/0013744 A1 * | 1/2002 | Tsunenari | G06Q 10/087 705/28 |

(Continued)

OTHER PUBLICATIONS

Sirkanungo, R. (2009). Information management system using two-dimensional barcodes and cell phone technology (Order No. 1468132). Available from ProQuest Dissertations & Theses Global. (304906535). (Year: 2009).*

(Continued)

*Primary Examiner* — Brittney N Miller
*Assistant Examiner* — Arielle E Weiner
(74) *Attorney, Agent, or Firm* — Hogan Lovells US LLP

(57) ABSTRACT

In certain embodiments, a system includes a processing system and tangible computer-readable media accessible by the processing system. The tangible computer-readable media may store software and purchase order identifications. Each purchase order identification indicates a respective one of a plurality of purchase orders, and each purchase order identification is globally unique with respect to each other. The software when executed by the processing system is configured to access a request comprising a first purchase order identification. The request had been generated at a client device that had decoded the one of the plurality of purchase order identifications from an optical scan of a code provided with packaging of one or more products of the respective purchase order indicated by the first purchase order identification. The software further generates data comprising information that facilitates returning at least one of the one or more products for receipt by the client device.

11 Claims, 4 Drawing Sheets

(56) References Cited

U.S. PATENT DOCUMENTS

| | | | |
|---|---|---|---|
| 2002/0032612 A1 | 3/2002 | Williams | |
| 2002/0178074 A1* | 11/2002 | Bloom | G06Q 10/08 |
| | | | 705/26.81 |
| 2003/0135432 A1* | 7/2003 | McIntyre | G06Q 10/087 |
| | | | 705/28 |
| 2003/0160097 A1 | 8/2003 | Steiner | |
| 2004/0143518 A1 | 7/2004 | Siegel | |
| 2004/0181310 A1 | 9/2004 | Stashluk, Jr. | |
| 2004/0215531 A1* | 10/2004 | Stashluk, Jr. | G06Q 10/087 |
| | | | 705/28 |
| 2006/0002123 A1 | 9/2006 | Krause | |
| 2009/0150251 A1* | 6/2009 | Zhitomirsky | G06Q 30/0601 |
| | | | 705/26.1 |
| 2010/0057586 A1 | 3/2010 | Chow | |
| 2011/0235085 A1 | 9/2011 | Jazayeri | |
| 2012/0109773 A1 | 5/2012 | Sipper | |
| 2013/0018726 A1* | 1/2013 | Ionescu | G06Q 30/00 |
| | | | 705/14.49 |

OTHER PUBLICATIONS

Reference U continued: Retrieved from https://www.proquest.com/dissertations-theses/information-management-system-using-two/docview/304906535/se-2?accountid=14753 (Year: 2009).*

John Herrman and Casey Chan, GIZMODO, The Best Barcode Scanner Apps, http://gizmodo.com/5713768/the-best-barcode-scanner-apps, Dec. 2010.

Zimmerman, M.E., U.S. Appl. No. 13/280,743, Non-Final Rejection, dated Aug. 12, 2013.

Zimmerman, M.E., U.S. Appl. No. 13/280,743, Response to Non-Final Rejection, dated Nov. 12, 2013.

Zimmerman, M.E., U.S. Appl. No. 13/280,743, Final Rejection, dated Feb. 12, 2014.

Zimmerman, M.E., U.S. Appl. No. 13/280,743, RCE and Amendment, dated May 12, 2014.

Zimmerman, M.E., U.S. Appl. No. 13/280,743, Non-Final Rejection, dated Jun. 5, 2014.

Zimmerman, M.E., U.S. Appl. No. 13/280,743, Response to Non-Final Rejection, dated Sep. 5, 2014.

Zimmerman, M.E., U.S. Appl. No. 13/280,743, Non-Final Rejection, dated Oct. 9, 2014.

Zimmerman, M.E., U.S. Appl. No. 13/280,743, Response to Non-Final Rejection, dated Jan. 8, 2015.

Zimmerman, M.E., U.S. Appl. No. 13/280,743, Final Rejection, dated Feb. 26, 2015.

Zimmerman, M.E., U.S. Appl. No. 13/280,743, Response to Final Rejection, dated Apr. 27, 2015.

Zimmerman, M.E., U.S. Appl. No. 13/280,743, Advisory Action, dated May 4, 2015.

Zimmerman, M.E., U.S. Appl. No. 13/280,743, Appeal Brief, dated Jul. 27, 2015.

Zimmerman, M.E., U.S. Appl. No. 13/280,743, Notice of Allowance, dated Nov. 18, 2015.

* cited by examiner

| PRODUCT ORDER IDENTIFICATION | ACCOUNT IDENTIFICATION | PRODUCT INFORMATION |
|---|---|---|
| ... .... ... | .... .... .. .... | .... .... .. .... |
| ... ... .... | .... ... ... .... | .... ... ... |
| ... .... ... | .... .... .. .... | .... .... .. .... |
| ... ... ... | .... ... ... ... | .... ... ... .... |
| ... .... .... | .... .... .. .... | .... .... .. .... |
| ... ... ... | .... ... ... ... | .... ... ... |

US 11,176,514 B1

COMPUTER-IMPLEMENTED METHOD AND A NON-TRANSITORY COMPUTER-READABLE MEDIUM FOR FACILITATING INITIATION OF CUSTOMER RETURNS

RELATED APPLICATION

This application is a divisional under 35 U.S.C. § 120 of U.S. application Ser. No. 13/280,743, filed Oct. 25, 2011, and entitled "Medium for Facilitating Initiation of Customer Returns," which is incorporated herein by reference.

BACKGROUND

People may wish to return products from one location to another for a variety of reasons. For example, someone may purchase one or more items at a store or receive one or more items in the mail and determine upon inspection that certain ones of the item(s) are defective or otherwise inconsistent with an expectation. As another example, someone may receive a gift that they wish to return for credit or cash rather than keep. In certain instances, it may not be readily apparent if, how, and/or to what location a product may be returned in exchange for a value commensurate with the returned product. In addition, from a product provider perspective, managing product returns may have inefficiencies for a variety of reasons.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

People may wish to return products from one location to another for a variety of reasons. For example, someone may change his or her mind about wanting the product. As another example, someone may purchase one or more items at a store or receive one or more products in the mail and determine upon inspection (e.g., of the product and/or its packaging) that certain ones of the product(s) are defective or otherwise inconsistent with an expectation.

Certain embodiments of the present disclosure may facilitate initiation of customer returns. For example, particular embodiments facilitate initiation of a process for returning a product from a first location to a second location. The first location may be, for example, a private or public mailbox where the product may be submitted for retrieval and delivery by a delivery service. The second location may be, for example, a location designated (e.g., by the product provider) for returning the product.

In certain embodiments may include conveying information regarding if, how, and/or to what location a product may be returned in exchange for a value. For example, a product may be delivered in packaging that includes one or more codes, such as, for example, a barcode and/or quick resource code. The code may be used to convey information that facilitates returning the product from a first location to a second location. If a receiver of the product desires to return the product, the receiver may use a device, such as, for example, a cell phone with a digital camera, to optically scan the code and to decode the information from the optical scan. In certain instances, the decoded information may be used to send a request for information that facilitates returning the product. For example, in response to the request, a data file may be provided that when printed provides a label for returning the product. In addition, a process for providing credit and/or a refund may be initiated in response to the request to return the product.

Figure 1:
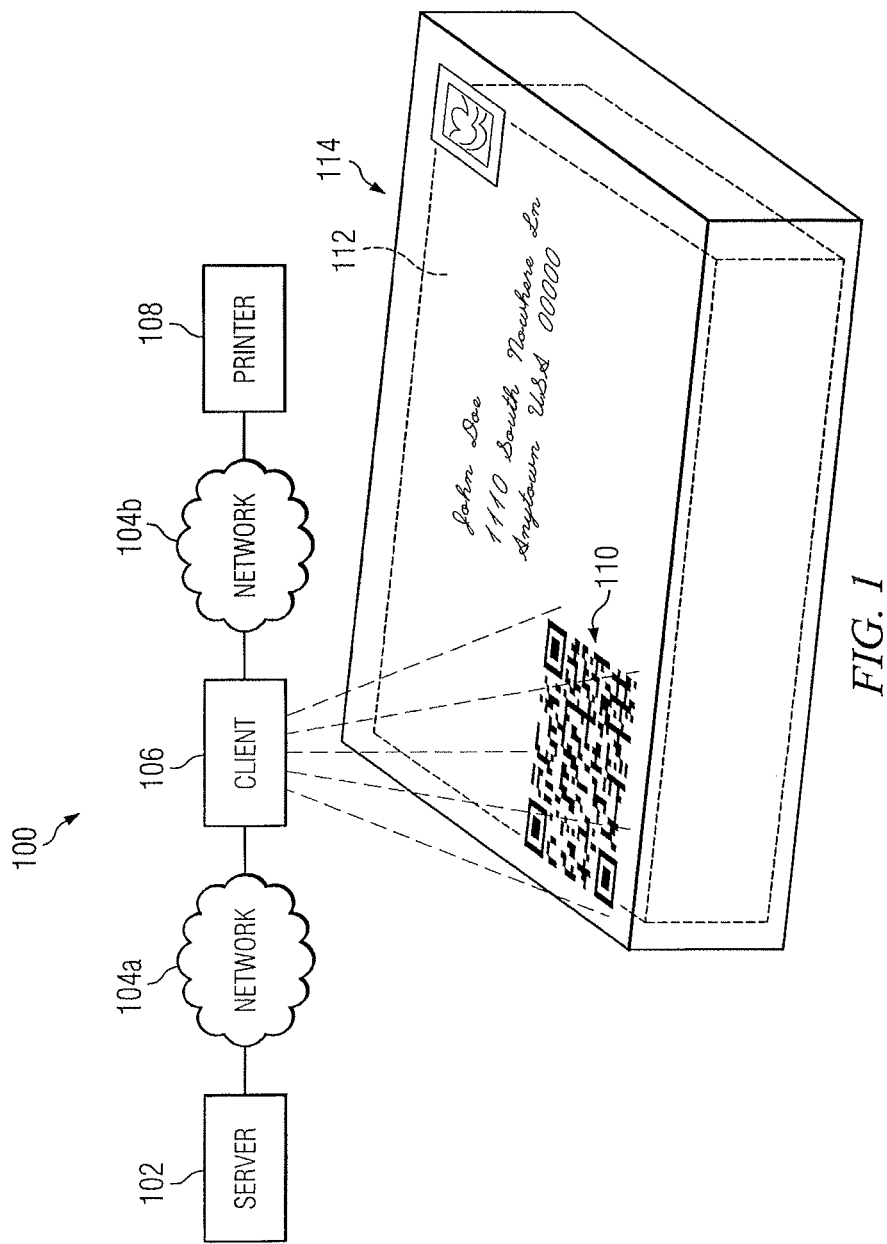
FIG. 1 shows an example system for facilitating initiation of customer returns.

FIG. 1 shows an example system 100 for facilitating initiation of customer returns. In certain embodiments, system 100 may facilitate returning a product from a first location to a second location. The first location may be, for example, a private or public mailbox where the product may be submitted for retrieval and delivery by a delivery service. The second location may be, for example, a location designated (e.g., by the product provider) for returning the product. The first and second locations as referred to herein as the "return initiation location" and the "designated return destination," respectively.

System 100 generally includes one or more servers 102 operable to communicate with one or more client device 106 through one or more networks 104a, each referred to hereinafter in the singular for simplicity. In certain embodiments, client device 106 may also be operable to communicate using one or more networks 104b to a printer 108. As explained further below, a person receiving product 112 in a package 114 may desire to return the product 112. In certain embodiments, a code 110 may be provided with the product 112 that may be used to convey information. Client device 106 may be used to optically image or scan code 110 and decode information conveyed by code 110. The information conveyed by code 110 and decoded by client device 106 may be used, in certain instances, to initiate a process for returning product 112 from a return origination location to a return destination to a return location designated by the sender of product 112. For example, the information may be used to send a request for information, to respond to a request for information, and/or to identify which product 112 will be returned. In a particular embodiment, server 102 may respond to a request initiated at client device 106 by providing a file that when printed (e.g., by printer 108) includes a label for returning the product 112 to a sender via mail, as explained further below.

Server 102 generally refers to any suitable computing device(s) operable to communicate with one or more clients 106 through network 104 to facilitate returning products 112 from a return initiation location to a designated return destination. Server 102 may be implemented in any suitable combination of hardware, firmware, and software. Server 102 may include one or more computer systems at one or more locations. Each computer system may include any appropriate input devices, output devices, mass storage media, processors, memory, or other suitable components for receiving, processing, storing, and communicating data, as discussed further below with respect to FIG. 2. Server 102 may include, for example, a file server, a domain name server, a proxy server, a web server, a computer workstation, or any other device operable to respond to requests for data from clients 106. Server 102 may execute with any of the well-known MS-DOS, PC-DOS, OS-2, MAC-OS, WINDOWS™, UNIX, or other appropriate operating systems, including future operating systems. In certain embodiments, server 102 comprises one or more Apache Jakarta Tomcat web servers, which may run on either WINDOWS or UNIX platforms.

Networks 104 may include platforms operable to exchange data or information. In various embodiments, networks 104 may include one or more packet data networks offering communication interfaces or exchanges between components of system 100. Networks 104 include any suitable combination of local area networks (LANs), metropolitan area networks (MANs), wide area networks (WANs), wireless local area networks (WLANs), virtual private networks (VPNs), intranets, Internets, plain old telephone systems (POTSs), or any other appropriate architecture or system that facilitates electronic communications. Certain networks 104 include wireless technology such as WiMax (802.16), WiFi (802.11), 3G, 4G, or any other suitable wireless technologies in any suitable combination. Although FIG. 1 illustrates networks 104a and 104b as being separate from each other, in certain embodiments networks 104a and 104b may be included in the same network 104.

Client device 106 generally refers to any suitable computing device(s) capable of using code 110 to initiate a request for returning one or more products 112 from a return initiation location to a designated return destination. For example, client device 106 may include a digital camera and an application for decoding the information conveyed by code 110. Client device 106 may use the information decoded from code 110 to transmit a request (e.g., for receipt by server 102) for returning product 112. Client device 106 may be implemented in any suitable combination of hardware, firmware, and software. Client device 106 may include one or more computer systems at one or more locations. Each computer system may include any appropriate input devices, output devices, mass storage media, processors, memory, or other suitable components for receiving, processing, storing, and communicating data, as discussed further below with reference to FIG. 3. For example, each computer system may include an integrated circuit (IC), printed circuit board (PCB), personal computer, workstation, network computer, kiosk, wireless data port, personal data assistant (PDA), one or more Internet Protocol (IP) telephones, one or more cellular/smart phones, one or more servers, a server pool, one or more processors within these or other devices, or any other suitable processing device. Certain ones of the above or other client devices may be mobile devices, such that they may be readily hand-carried by a user.

Code 110 may convey information that facilitates a process for returning product 112 after the product 112 has been received. For example, code 110 may convey any suitable combination of text-based instructions and/or queries, contact information (e.g., a phone number, mailing address, and/or email address of the sender of product 112), logic for accessing a webpage (e.g., a Uniform Resource Location, a Uniform Resource Identifier, IP address, etc.), information regarding product 112, an identification of a purchase order for product 112, and other information that facilitates returning product 112 from a return initiation location to a designated return destination. In certain embodiments, code 110 may convey information regarding an identification of product 112. For example, code 110 may be used to identify a serial number of product 112 that uniquely identifies that product 112. In particular embodiments, code 110 may convey information that facilitates communication between client device 106 and server 102. Additional details regarding certain examples codes 110 are described below with reference to FIGS. 6A through 6D.

In certain instances, code 110 may include human-readable text providing instructions as to the purpose and use of code 110. Code 110 may convey other information as a machine-readable pattern of geometric shapes, colors, and/or spacing between geometric shapes. For example, code 110 may be a printed label having one or more barcodes, quick resource codes (QR codes), or any of a variety of other patterns of shapes, geometric shapes, colors, and/or spacing between geometric shapes. In certain instances, code 110 may be attached, printed, or otherwise integrated into off-the-shelf packaging of product 112, such that code 110 may be visible to browsing shoppers even before product 112 is purchased. In other instances, product 112 may be enclosed within a 114 package displaying code 110 thereon, as shown in FIG. 1, code 110 may be included as an insert within package 114, and/or code 110 may be attached, printed, or otherwise integrated into packaging of product 112 internal to package 114.

In certain instances, product 112 refers to one or more items offered for sale that are provided pursuant to a purchase order and received at a shipping destination from which product 112 may be returned to a designated return destination. In other instances, product 112 refers to one or more items that are purchased at a market location, such as a retail store, and that may be returned from a return initiation location to a designated return destination.

In operation, system 100 may facilitate returning a product 112 from a return initiation location to a designated return destination. A receiver of product 112 may wish to return product 112 for a variety of reasons. For example, a receiver of product 112 may determine upon inspection that the product 112 is defective or otherwise inconsistent with an expectation. As another example, a receiver of a package 114 having a product 112 enclosed therein may determine upon inspection of the package 114 that the receiver wishes to return the package 114 and its enclosed product 112. Client device 106 may be used to generate a scanned electronic image by optically scanning code 110 using a digital camera and/or other optical sensor(s). Client device 106 may execute a code reader application to decode code 110. Additionally or alternatively, client device 106 or may communicate the scanned electronic image (e.g., through network 104) to another device for decoding.

The information decoded from code 110 may be used, for example, in returning product 112 from a return initiation location to a designated return destination. For example, client device 106 may use the information decoded from code 110 to transmit a request (e.g., to server 102). The request may include an identification of product 112, such as, for example, a serial number of product 112 as decoded from code 110. Server 102 may access the request and determine that it is a request to return a particular product 112.

Server 102 may generate a response to the request by generating a message that includes information for returning the product 112 to the sender. For example, the message may be, or may include, a file that when printed (e.g., by printer 108) includes a label for returning the product 112 to a sender via mail. In certain instances, the label may have a mailing address for the sender that is different from a return address posted on package 114. As another example, the message generated by server 102 may be, or may include, a query for receipt by client device 106. The query may request input regarding a reason for returning the product to the sender. In certain instances, the query message may be displayable by client device 106 as a menu of selectable options and/or as a text box where an open-ended answer may be inputted by the receiver of product 112. In certain embodiments, the message generated by server 102 may request input as to how the return of product 112 should be processed. For example, the message may request input as to which one or more of various refund and/or crediting options should be used and/or may request input as to whether a replacement product should be sent.

If the message received at client device 106 includes a printable file, client device 106 may communicate the file to printer 108 for printing. In certain instances, client device 106 may be configured to communicate wirelessly with printer. For example, a user operating client device 106 at his or her doorway may use client device 106 to send a print request to a printer 108 that may be located within the interior of his or her house; however, any suitable communication between client device 106 and printer 108 may be used.

The information decoded from code 110 may also be used in providing a credit and/or a refund for product 112 in the event product 112 is returned. For example, server 102 may use information provided in a request by client device 106 to uniquely identify one or more of product 112, an account associated with that product 112, and/or a purchase price of the product 112. Server 102 may use the information provided in a request by client device 106 to refund and/or credit a monetary value to the account (e.g., based at least in part on the identified purchase price of the product 112).

While FIG. 1 illustrates various components, in certain alternative embodiments some or all of the functionality of the present disclosure may be implemented using memory and/or processors of one or more other devices in communication with the illustrated components. In addition, some or all of the components and/or data structures of system 100 may also be stored (e.g., as software instructions or structured data) on a computer-readable medium, such as one or more of a hard disk, a memory, a network, and/or a portable media article (e.g., a DVD or flash memory devices) to be read by an appropriate drive or via an appropriate connection. The system 100 components and data structures may also be transmitted as generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the described functionality may be implemented using other configurations.

Figure 2:
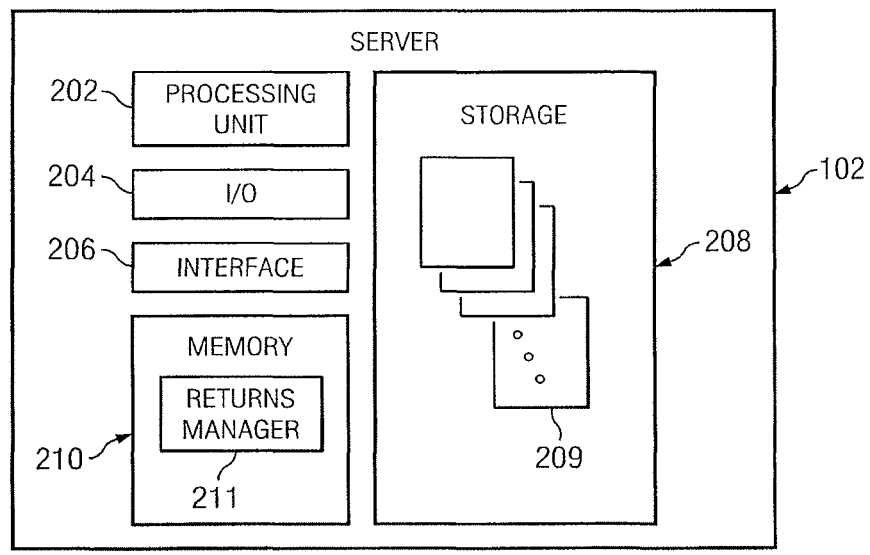
FIG. 2 shows additional details of an example server of the system of FIG. 1.

FIG. 2 shows additional details of the example server 102 of the system 100 of FIG. 1. In the illustrated embodiment, server computing system 200 includes one or more processing units 202, various I/O functionality 204, one or more interfaces 206, one or more storage units 208, and a returns manager 211 application encoded in memory 210, each referred to hereinafter in the singular for simplicity. In certain embodiments, server 102 includes a combination of hardware, firmware, and software that facilitates returning product 112 to a sender by interacting with client device 106 through network 104.

Processing unit 202 may refer, for example, to the one or more tangible devices of server 102 capable of carrying out instructions, such as that of a computer program. For example, processing unit 202 may include one or more microprocessors, controllers, or any other suitable computing devices or resources. Processing unit 202 may work, either alone or with other components of server 102, to provide a portion or all of the functionality of server 102 described herein. For example, processing unit 202 may be execute or realize various logic-based functions of returns manager 211.

I/O functionality 204 may include, for example, any communication method of server 102 (e.g., from an image buffer to a display). Input functionality may include, for example, the receiving signals or data by server 102. Output functionality may include, for example, the communication of signals or data by server 102. These terms may also refer to part of an action, such as, for example, to "perform I/O" may involve performing an input and/or output operation. In some cases, one or more communication devices of server computing system 200 may be used to implement both input and output functionality.

Interface 206 may include, for example, any tangible device(s) that may be used (e.g., by a person, or by another device or system) to communicate with server 102. In certain embodiments, any suitable combination of keyboards, mice, touch screens, and speech recognition devices may be considered an input interfaces 206 and monitors and printers may be considered output interfaces 206.

Storage unit 208 and memory unit 210 may each include any number of tangible storage media. Additionally, all or part of storage unit 208 and/or memory unit 210 could reside locally within server 102 or could reside at a location external but accessible to server 102 (e.g., within removable media, and/or at an external database). In certain embodiments, storage unit 208 and memory unit 210 may each take the form of a suitable combination of volatile and non-volatile memory including, without limitation, magnetic media, optical media, RAM, ROM, removable media, or any other suitable memory component. Where appropriate, RAM may be dynamic RAM (DRAM) or static RAM (SRAM). Moreover, where appropriate, this RAM may be single-ported or multi-ported RAM. This disclosure contemplates any suitable RAM. In certain embodiments, storage 208 may include one or more databases.

Storage unit 208 may be used to store one or more data entries 209 that contain information that facilitates returning product 112 from a return initiation location to a designated return destination. In certain embodiments, the data entries 209 may include an identification of a purchase order, one or more products 112 associated with a purchase order, a purchase price paid for a purchase order, an account associated with a purchase order, a time period during which products 112 of a particular purchase order may be returned, a designated address where certain product 112 may be returned, any combination of the preceding, or other information that may facilitate returning product 112 to a designated return location. Additional detail regarding data entries 209 is described below with reference to FIG. 5.

In certain embodiments, the described processing and memory elements (such as memory unit 210 and processing unit 202) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In this example, returns manager 211 is stored within memory unit 208; however, returns manager 210 may be stored external to memory unit 208 and/or external to server 102. Returns manager 211 is an application that facilitates returning product 112 to a sender by interacting with client device 106 through network 104. The interaction may include accessing information, conveying information to client device 106, and requesting information from client device 106. In addition, returns manager 211 may be used to initiates procedures that facilitate managing product returns. In certain embodiments, the procedures may include, for example, updating account information, generating notices, obtaining permissions for a return request, updating records regarding returns, or a variety of other procedures that facilitate managing product returns.

As examples and not by way of limitation, server 102 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, another type of host, or a combination of two or more of these. Where appropriate, server 102 may include one or more computer systems; be unitary or distributed; span multiple locations; span multiple machines; or reside in a cloud, which may include one or more cloud components in one or more networks. Where appropriate, server 102 may perform without substantial spatial or temporal limitation one or more operations of one or more methods described or illustrated herein. As an example and not by way of limitation, server 102 may perform in real time or in batch mode one or more operations of one or more methods described or illustrated herein. One or more servers 102 may perform at different times or at different locations one or more operations of one or more methods described or illustrated herein, where appropriate.

Figure 3:
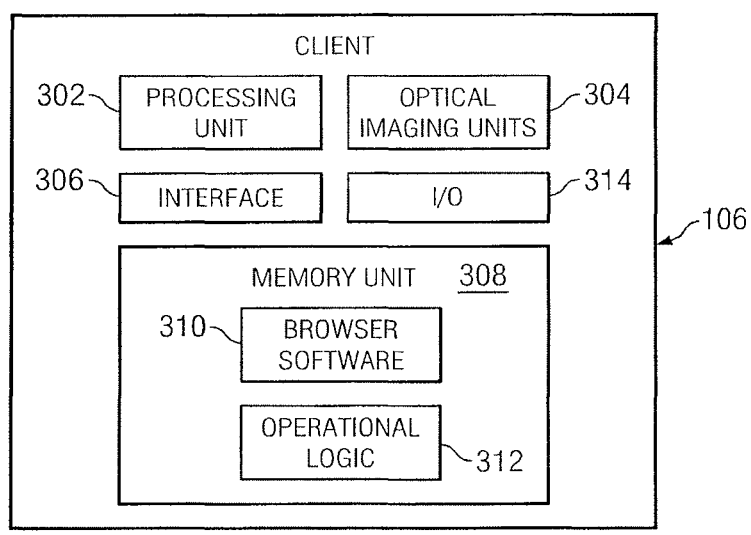
FIG. 3 shows additional details of an example client device of the system of FIG. 1.

FIG. 3 shows additional details of the example client device 106 of the system 100 of FIG. 1. As shown in FIG. 3, client device 106 may include one or more processing units 302, one or more optical imaging units 304, one or more interfaces 306, and one or more memory units 308, and various I/O functionality 314, each referred to hereinafter in the singular for simplicity. In certain embodiments, client device 106 includes a combination of hardware, firmware, and software that facilitates imaging and decoding code 110.

Processing unit 302 may refer, for example, to the one or more tangible devices of client device 106 capable of carrying out instructions, such as that of a computer program. For example, processing unit 302 may include one or more microprocessors, controllers, or any other suitable computing devices or resources. Processing unit 302 may work, either alone or with other components of client device 106, to provide a portion or all of the functionality of client device 106 described herein. For example, processing unit 302 may be execute or realize various logic-based functions of browser software 310 and/or operation logic 312.

Each optical imaging unit 304 may be configured to generate electronic data representative of an optical scan of code 110. For example, optical imaging unit 304 may include a digital camera capable of generating digital photographs of code 110. As another example, imaging unit 304 may include a scanner (e.g., a barcode scanner) capable of translating optical impulses into electrical ones.

Interface 306 may include, for example, any tangible device(s) that may be used (e.g., by a person, or by another device or system) to communicate with client device 106. For example, any suitable combination of keypads, touch screens, and speech recognition devices may be considered input interfaces 306 and a display screen may be considered output interfaces 306.

Memory unit 308 may include any number of tangible storage media. Additionally, all or part of memory unit 308 could reside locally within client device 106 or could reside at a location external but accessible to server 106 (e.g., within removable media, and/or at an external database). In certain embodiments, memory unit 308 may take the form of a suitable combination of volatile and non-volatile memory including, without limitation, magnetic media, optical media, RAM, ROM, removable media, or any other suitable memory component. Where appropriate, RAM may be dynamic RAM (DRAM) or static RAM (SRAM). Moreover, where appropriate, this RAM may be single-ported or multi-ported RAM. This disclosure contemplates any suitable RAM. Memory 308 may include, for example, applications programs, network, communication programs, operating system software data, etc. In certain embodiments, memory 308 may include decoder software capable of analyzing image data provided by optical imaging unit and decoding the information conveyed by code 110.

Client device 106 may include browser software 310, which in this example is stored within memory unit 308. Brower 310 generally refers to any suitable software application that enables a user to display and interact with information (e.g., text, images, videos, music, etc.) typically located on a web page at a web site (e.g., a web site on the World Wide Web, a local area network, hosted by server 104, etc.).

Client device 106 may include, or may be configured to access, operational logic 312 that when executed facilitates returning a product 112 to a sender. Operational logic 312 may be implemented in any suitable combination of hardware, firmware, and software. In certain embodiments, operational logic 312 comprises a set of computer-readable instructions (e.g., stored in memory unit 308 or some other suitable computer-readable storage medium) that when executed by processing unit 302 are operable to perform certain operations. For example, operational logic 312 may use the information decoded from code 110 to execute a program and/or generate a request that initiates a procedure for returning product 112 to a sender.

I/O functionality 314 may include, for example, any communication method of client device 106 (e.g., from an image buffer to a display). Input functionality may include, for example, the receiving signals or data by client device 106. Output functionality may include, for example, the communication of signals or data by client device 106. These terms may also refer to part of an action, such as, for example, to "perform I/O" may involve performing an input and/or output operation. In some cases, one or more communication devices of client device 106 may be used to implement both input and output functionality.

As examples and not by way of limitation, client device 106 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, another type of host, or a combination of two or more of these. Where appropriate, client device 106 may include one or more computer systems; be unitary or distributed; span multiple locations; span multiple machines; or reside in a cloud, which may include one or more cloud components in one or more networks. Where appropriate, client device 106 may perform without substantial spatial or temporal limitation one or more operations of one or more methods described or illustrated herein. As an example and not by way of limitation, client device 106 may perform in real time or in batch mode one or more operations of one or more methods described or illustrated herein. One or more clients 106 may perform at different times or at different locations one or more operations of one or more methods described or illustrated herein, where appropriate.

Figures 4, 5:
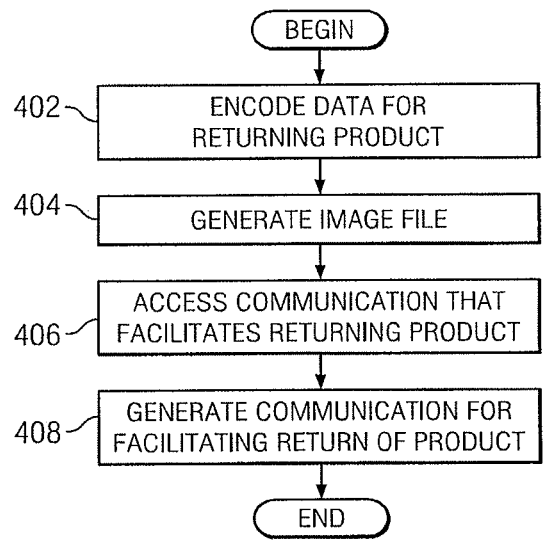
FIG. 4 illustrates an example method for facilitating initiation of customer returns.
FIG. 5 shows example data entries that may be used by the system of FIG. 1 to store information that facilitates returning one or more products from a return initiation location to a designated return destination.

FIG. 4 illustrates an example method for facilitating initiation of customer returns. In certain instances, the method may be used to facilitate returning a product from a first location to a second location. The first location may be, for example, a private or public mailbox where the product may be submitted for retrieval and delivery by a delivery service. The second location may be, for example, a location designated (e.g., by the product provider) for returning the product.

At operation 402, machine-readable data may be encoded into a plurality of image components. The encoded data may convey information that facilitates a process for returning product 112 from a return initiation location to a designated return destination. For example, the data may convey any suitable combination of one or more instructions, queries, contact information (e.g., a phone number, email address, and/or mailing address of the sender of product 112), logic for accessing a webpage (e.g., a Uniform Resource Location, a Uniform Resource Identifier, IP address, etc.), information regarding product 112, information regarding a purchase order for product 112, and other information that facilitates returning product 112 to a designated product return location. In certain embodiments, the data encoded at operation 402 may convey an identification of a purchase order for product 112. Additionally or alternatively, the data may convey an identification of one or more products 112 (e.g., by serial number) included in a purchase order. In particular embodiments, the data encoded at operation 402 may convey information that facilitates communication between client device 106 and server 102.

At operation 404, an image file may be generated that facilitates returning product 112 from a return initiation location to a designated return destination. For example, the data encoded at operation 402 as a plurality of image components may be used to generate an image file that includes a machine-readable pattern of those image components. The pattern of image components may include, for example, geometric shapes, colors, and/or spacing between geometric shapes, which collectively represent the data encoded at operation 402. In certain embodiments, the image file may include one or more barcodes, quick resource does, other code types, and/or any suitable combination thereof. Particular image files include content that may be printed or otherwise displayed on tangible media as codes 110. FIGS. 6A through 6D show several example codes that may printed or otherwise rendered on tangible media (e.g., a package label, a package insert, etc.) using an image file generated at operation 404.

At operation 406, one or more communications are accessed that facilitate returning product 112 from a return initiation location to a designated return destination. Certain communication may be initiated at client device 106 and accessed at server 102. For example, a person receiving one or more products 112 may desire to return at least one of those products 112. The person may use client device 106 to optically image or scan a code 110 that may be provided with package 114. The client device 106 may also decode information conveyed by the optical image or scan of code 110. Client device 106 may present some or all of the decoded information to the person (e.g., using a display and/or speakers of client device 106). The person may use the information presented by client device 106 to submit a communication that may be accessed by server 102. For example, the person may respond to the presented information by clicking on a link, pressing a button, selecting an item from a menu, typing a Uniform Resource Locator, vocalizing a command, any combination of the proceeding, and/or by providing other input using client device 106. Additionally or alternatively, client device 106 may use the decoded information to automatically submit a communication that may be accessed at server 102.

The communication(s) accessed at operation 406 may include any suitable combination of one or more instructions, queries, responses to queries, contact information (e.g., a phone number, email address, and/or mailing address of either the sender or the receiver of product 112), logic for accessing a webpage (e.g., a Uniform Resource Location, a Uniform Resource Identifier, IP address, etc.), information regarding product 112, information regarding a purchase order for product 112, and other information that facilitates returning product 112 from a return initiation location to a designated return destination. In certain embodiments, the communication accessed at operation 406 may convey an identification of a purchase order for product 112. Additionally or alternatively, the communication accessed at operation 406 may convey an identification of one or more products 112 (e.g., by serial number) included in a purchase order.

At operation 408, communication is generated that includes information that facilitates returning product 112 from a return initiation location to a designated return destination. Certain communication generated at operation 408 may be responsive to one or more communications accessed at operation 406. For example, server 102 may generate one or more communications for receipt by client device 106 in response to communication initiated at client device 106. Various communications may be generated that facilitate returning product 112 from a return initiation location to a designated return destination. In certain instances, for example, the communication may include a file that when printed comprises a mailing address for returning product 112 from a return initiation location to a designated return destination. As another example, the communication may include logic that client device 106 may use to display a prompt requesting a selection of one or more products 112 associated with a purchase order. A person may use client device 106 to input a selection of which product(s) 112 the person desires to return. As another example, the communication may include logic that client device 106 may use to display a prompt requesting input of one or more reasons for returning product 112. A person may use client device 106 to input those reasons in a communication that may be accessed by server 102. As another example, the communication may include an acknowledgement that a procedure for returning the at least one product of the one or more products has been initiated. As another example, the communication may include data indicating a mail drop location (e.g., one of a plurality of public mailbox locations)

determined based at least in part on an estimated location of client device 106. Server 102 may estimate the location of client device 106 using, for example, data received from client device 106 (e.g., global positioning system (GPS) data) and/or data received from a network (e.g., network 104) servicing client device 106. In certain instances, the data may indicate which mail drop location may be most readily accessible from the estimated client device 106 location.

FIG. 5 shows example data entries 209 that may be used by system 100 of FIG. 1 to store information that facilitates returning one or more products 112 from a return initiation location to a designated return destination. In this example, data entries 209 are organized in the form of a table 50; however, any suitable data organization may be used. Table 500 includes a series of rows and columns, with each row corresponding to a respective purchase order and each column corresponding to respective classes of information that may be used to further define a purchase order. For example, column 502 may include data entries 209 for purchase order information. In certain embodiments, the purchase order information may include an identification of a purchase order. The purchase order identifications used to identify purchase orders may be globally unique with respect to each other. In particular embodiments, a designated return mailing address may be included with the data entries 209 corresponding to the purchase order information. For certain purchase orders that include multiple products 112, more than one return mailing address may be included, each mailing address associated with at least one of those products. Column 504 may include data entries 209 that store account information. For example, the data entries 209 of column 504 may be used to identify the user account of a buyer associated with a particular purchase order. Column 506 may include data entries 209 storing product information. For example, the data entries 209 of column 506 may be used to identify one or more products 112 associated with a purchase order. In certain embodiments, the data entries 209 of column 506 may include one or more product serial numbers.

Storage unit 208 may be used to store one or more data entries 209 that contain information that facilitates returning product 112 from a return initiation location to a designated return destination. In certain embodiments, the data entries 209 may include an identification of a purchase order, one or more products 112 associated with a purchase order, a purchase price paid for a purchase order, an account associated with a purchase order, a time period during which products 112 of a particular purchase order may be returned, a designated address where certain product 112 may be returned, any combination of the preceding, or other information that may facilitate returning product 112 to a designated return location. Additional detail regarding data entries 209 is described below with reference to FIG. 5.

Figure 6A:
FIGS. 6A-6D illustrate example codes that may be used by the system of FIG. 1 to convey information that facilitates returning products one or more products from a return initiation location to a designated return destination.
Figure 6B:
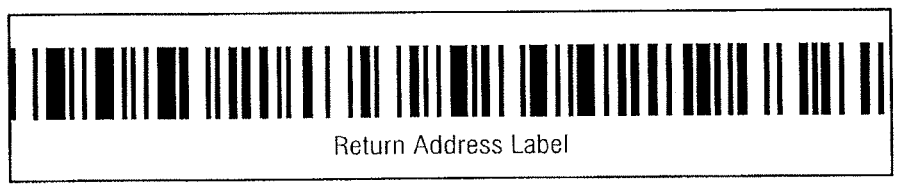
Figure 6C:
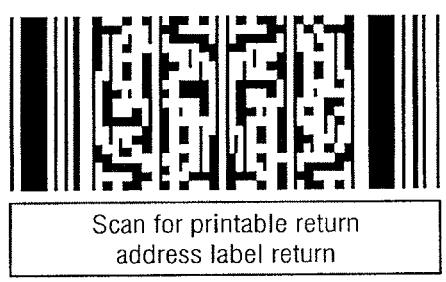
Figure 6D:

FIGS. 6A-6D illustrate example codes 110 that may be used by the system 100 of FIG. 1 to convey information that facilitates returning one or more products 112 from a return initiation location to a designated return destination. In particular, FIG. 6A shows one example of a quick resource code 110, FIG. 6B shows one example of a one-dimensional barcode, FIG. 6C shows one example of a code 110 that uses a combination of a two-dimensional dot matrix code and a single-dimensional barcode, and FIG. 6D shows one example of a two-dimensional barcode. Although several example codes 110 are shown, any suitable code 110 may be used.

Certain codes 110 may include text-based instructions that inform a reader as to a function of code 110. For example, the codes 110 shown in FIGS. 6A and 6D each include the text-based instructions "Scan to initiate product return;" the code 110 shown in FIG. 6B includes the text-based instructions "Return Address Label," and the code 110 shown in FIG. 6C includes the text-based instructions "Scan for printable return address label;" however, any suitable instructions may be used to convey information as to the function of code 110, including, for example, instructions that are not text-based.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. For example, steps 406 and 408 may be repeated any number of times as a person uses a client device 106 to interact with server 102. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer-implemented method comprising:
   generating by a computing system a machine-readable image file associated with an order, the machine-readable image file when decoded comprising a website address to a website that provides first information for return of one or more products based in part on accessing second information in the order;
   receiving by the computing system a request from a mobile device that had decoded the website address from an optical scan of a product packaging label having a physical representation of the machine-readable image file, the request providing at least one first identification associated with the one or more products;
   accessing, by the computing system, the second information from the order based in part on the at least one first identification from the request;
   generating data for receipt by the mobile device based in part on the second information, the data comprising instructions and comprising second identification of the one or more products; and
   enabling, using the instructions, an at least one selection input associated with the second identification to return at least one product of the one or more products, the at least one selection input to generate at least a file, the file to provide a mailing address for returning the at least one product.

2. The method of claim 1, wherein the data for receipt by the mobile device further comprises one or more of:
   the instructions further for a prompt to enable the at least one selection input of the at least one product;

the instructions further for a prompt to enable input of one or more reasons for returning the at least one product; or an acknowledgement that a procedure for returning the at least one product has been initiated.

3. The method of claim 1, wherein the physical representation of the machine-readable image file comprises one or more of a quick resource code (QR code) and a barcode.

4. The method of claim 1, further comprising:
identifying an account associated with the request from a mobile device that had decoded the website address; and
refunding the identified account a monetary value based at least in part on a total purchase price of the at least one of the one or more products.

5. The method of claim 1, wherein the data for receipt by the mobile device indicates a mail drop location determined based at least in part on an estimated location of the mobile device.

6. A non-transitory computer-readable medium comprising instructions, the instructions configured to, when executed by one or more processors, cause the one or more processors to perform operations comprising:
generating a machine-readable image file associated with an order, the machine-readable image file when decoded comprising a website address to a website that provides first information for return of one or more products based in part on accessing second information in the order;
receiving a request from a mobile device that had decoded the website address from an optical scan of a product packaging label having a physical representation of the machine-readable image file, the request providing at least one first identification associated with the one or more products;
accessing, by the computing system, the second information from the order based in part on the at least one identification from the request generating data for receipt by the mobile device based in part on the second information, the data comprising instructions and comprising second identification of the one or more products; and enabling, using the instructions, an automatic return or an at least one selection input associated with the second identification, the automatic return or the at least one selection input to provide at least a file that when printed comprises a mailing address for returning at least one product of the one or more products.

7. The non-transitory computer-readable medium of claim 6, wherein the data for receipt by the mobile device further comprises one or more of:
the instructions further for a prompt to enable the at least one selection input of the at least one product;
the instructions further for a prompt requesting to enable input of one or more reasons for returning the at least one product; or
an acknowledgement that a procedure for returning the at least one product has been initiated.

8. The non-transitory computer-readable medium of claim 6, wherein the physical representation of the machine-readable image file comprises one or more of a quick resource code (QR code) and a barcode.

9. The non-transitory computer-readable medium of claim 6, wherein the data for receipt by the mobile device further comprises additional instructions for:
identifying an account associated with the request from the mobile device that had decoded the website address; and
refunding the identified account a monetary value based at least in part on a total purchase price of the at least one of the one or more products.

10. The non-transitory computer-readable medium of claim 6, wherein the data for receipt by the mobile device indicates a mail drop location determined based at least in part on an estimated location of the mobile device.

11. The non-transitory computer-readable medium of claim 6, wherein second data for receipt by the mobile device comprises additional instructions for:
informing that the at least one product has returned to a designated location.

\* \* \* \* \*